July 1, 1958

J. BEIER 2,841,019

INFINITELY VARIABLE FRICTION DISK
POWER TRANSMISSION

Filed Sept. 27, 1954

INVENTOR
Josef Beier
BY
Michael S. Striker
ATTORNEY

July 1, 1958

J. BEIER 2,841,019

INFINITELY VARIABLE FRICTION DISK POWER TRANSMISSION

Filed Sept. 27, 1954

INVENTOR
Josef Beier
BY
Michael S. Striker
ATTORNEY

July 1, 1958

J. BEIER 2,841,019

INFINITELY VARIABLE FRICTION DISK
POWER TRANSMISSION

Filed Sept. 27, 1954

INVENTOR
Josef Beier
BY
Michael S. Striker
ATTORNEY

United States Patent Office 2,841,019
Patented July 1, 1958

2,841,019

INFINITELY VARIABLE FRICTION DISK POWER TRANSMISSION

Josef Beier, Sarnen, Switzerland; Alice Beier, nee Siegenheim, Karlsruhe, Germany, Hans Herbert Beier, East-Boldon, England, and Regine Beier, Karlsruhe, Germany, heirs of the estate of said Josef Beier, deceased Application September 27, 1954, Serial No. 458,573

Claims priority, application Germany December 18, 1953

9 Claims. (Cl. 74—199)

The present invention refers to gradually variable friction transmissions, and particularly to a gradually variable friction transmission of the type in which conical friction discs co-operate with friction discs having friction rims. More particularly the present invention relates to a friction transmission of the type in which the friction discs are arranged in a manner similar to an epicyclic gear train.

In friction transmissions of this type a first group of friction discs are arranged on a drive shaft similar to a sun gear, a second group of friction discs is arranged on parallel shafts similar to planetary shafts, and a third group of friction discs has annular shape and is arranged in the manner of the internal gear of an epicyclic train.

In known friction transmissions of this type the three groups of friction discs are arranged substantially in one plane. Consequently, when conical friction discs of the second group are inwardly moved so that they deeply project into the rim-type friction discs of the first group, their peripheral portions are engaged by the rims of the rim-type friction discs of the third group of annular friction discs. When the second group of friction discs is moved outwardly, they deeply project into the friction discs of the third group, while only the peripheral portions of the friction discs of the first and second groups are in frictional engagement. The known arrangements of this type have the disadvantage that the conical friction discs of the second group are forced to assume an oblique position since the rims of the first group of friction discs and the rims of the third group of friction discs engage radially spaced portions of the friction discs of the second group, such portions being of different thickness due to the conical shape of the friction discs of the second group.

The conditions are similar when the friction discs of the first and third groups are conical, and the friction discs of the second group have friction rims.

An oblique position of the friction discs is a serious disadvantage since the rims of the friction discs do not engage the conical friction faces of the co-operating friction discs with the friction faces of the rims but along radially spaced circular edge portions of the rims which results in different effective radii acting on the same friction discs so that frictional losses are produced. The conditions become more unfavorable as the load transmitted by the drive is increased since a higher load requires a greater number of friction discs in each group so that the outermost conical friction discs assume a considerably inclined position in the constructions of the known art.

Another disadvantage of the known constructions in which the friction discs are forced into an oblique position resides in that the peripheral zones of the conical discs slide on the lateral faces of the rim-type friction discs while the rims engage inwardly located zones of the conical discs.

It is the object of the present invention to overcome disadvantages of the known friction transmissions of the type described, and to provide a variable friction transmission in which the friction discs remain substantially parallel regardless of their relative position.

It is another object of the present invention to provide two axially spaced groups of intermediate friction discs which are connected for rotation and are shiftable for engaging respectively other groups of friction discs for connecting the same in a variable transmission ratio, while the friction discs of each group of intermediate friction discs remain in parallel position.

It is a further object of the present invention to arrange all friction discs axially slidable but non-rotatable on rotary means.

It is still a further object of the present invention to provide torque and load responsive wedge means for pressing the friction discs together.

It is another object of the present invention to provide a stationary pressure member and a movable pressure member for each pair of intermeshing friction disc sets, and to arrange the movable pressure members between the stationary pressure members so that the remote ends of the two axially spaced sets of intermediate friction discs does not vary regardless of the position of the movable pressure members and of the spacing of the friction discs of the individual groups.

With these objects in view the present invention mainly consists in a gradually variable friction transmission which comprises, in combination, two pairs of meshing rotary friction wheel means spaced from each other in axial direction; shiftable supporting means supporting one friction wheel means of each pair of friction wheel means for movement together in substantially radial direction relative to the other friction wheel means of each pair of friction wheel means so as to gradually vary the transmission ratio of the pairs of friction wheel means, one friction wheel means of each pair of friction wheel means being of the type having conical friction face means, and the other friction wheel means of each pair of friction wheel means being of the type having peripheral friction rim means, the friction wheel means supported by the shiftable supporting means being of the same type.

The present invention also consists in a friction transmission comprising, first rotary friction wheel means having a first axis of rotation; second rotary friction wheel means arranged spaced from the first rotary friction wheel means in radial and axial directions; two groups of third rotary friction wheel means spaced from each other in axial direction and having a common second axis of rotation parallel to the first axis of rotation, one of the two groups of third friction wheel means being in frictional meshing engagement with the first rotary friction wheel means, and the other of the two groups of third friction wheel means being in frictional meshing engagement with the second rotary friction wheel means; movable supporting means supporting the third friction wheel means for movement between one position in which the first and second axes are farther spaced, and another position in which the first and second axes are closer spaced; and operating means for moving the movable supporting means whereby the ratios of transmission between the first and third friction wheel means on one hand, and between the second and third friction wheel means on the other hand are gradually changed.

Preferably, the second rotary friction wheel means are annular and have an axis of rotation coinciding with the axis of the first friction wheel means. In this embodiment a plurality of shafts arranged in the manner of planetary shafts in an epicyclic gear train are provided, each shaft supporting two groups of third rotary friction wheel means.

Preferably, the friction wheel means are mounted on shafts non-rotatable and slidable in axial direction. The first and second friction wheel means are pressed together into frictional engagement by pressure members which are operated by spring means.

According to a preferred embodiment of the present invention wedge means are provided which are connected to the movable pressure members for actuating the same to an extent depending on the load transmitted by the drive.

The movable pressure members are preferably arranged between the stationary pressure members so that the shaft length between the remote ends of the two groups of third friction wheel means remains the same regardless of the position of the movable pressure members.

The friction discs are shifted on their respective shafts and are farther spaced when the friction rims engage inner thicker portions of the conical friction discs than when the friction rims engage the thin peripheral portions of the conical friction discs. In order to facilitate the axial sliding of the friction discs on their respective shafts, the center bores in the friction discs are preferably bounded by convex arcuate surfaces and widen in opposite axial directions. This construction provides a greater play and permits the friction discs to assume a slightly inclined position to compensate for unavoidable irregularities of the friction surfaces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
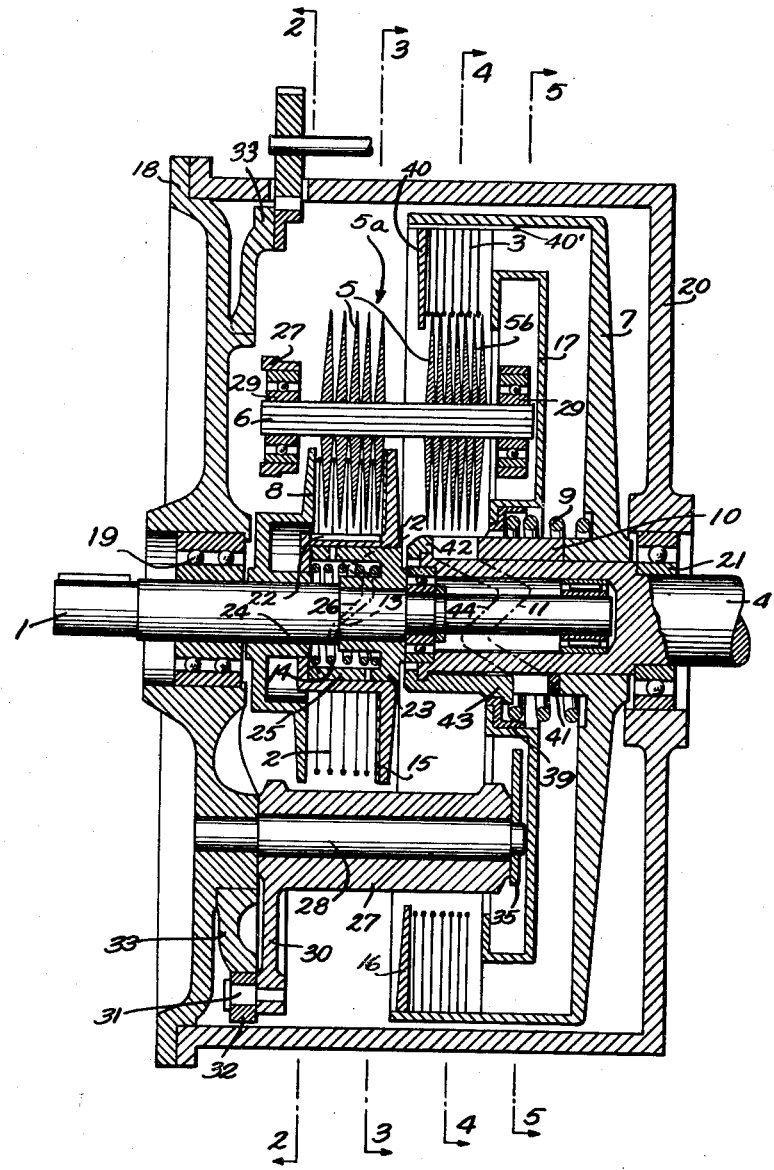
Fig. 1 is an axial sectional view of a preferred embodiment of the present invention taken on line 1—1 in Fig. 2.
Figure 6:
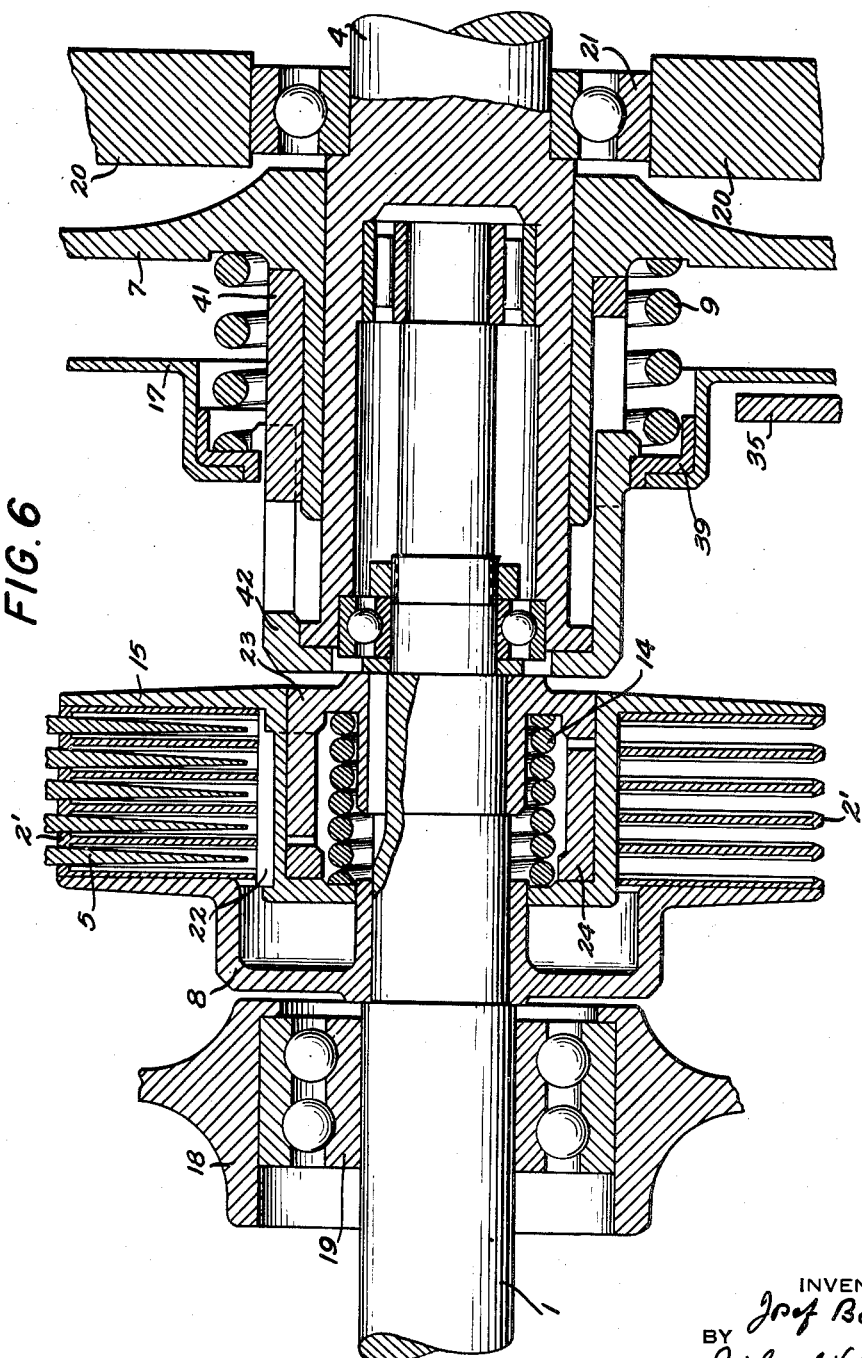
Fig. 6 is a longitudinal sectional view showing a detail of Fig. 1 on an enlarged scale.

Referring now to the drawings and more particularly to Figs. 1 and 6, the shaft 1 is considered a drive shaft, and the shaft 4 is considered a driven shaft, but it will be understood that the arrangement may be reversed. The drive shaft 1 is mounted in the casing 18 at one end thereof in a ball-bearing 19, while the other end of shaft 1 is turnably mounted by means of a ball-bearing in the end of the coaxial shaft 4. The driven shaft 4 is turnably mounted in the casing 20 in a ball-bearing 21.

The casing 18 or 20, respectively, may be secured to the body of a motor, or form part thereof. It is, however, possible to support the casings 18, 20 in any other suitable manner.

Figure 7:
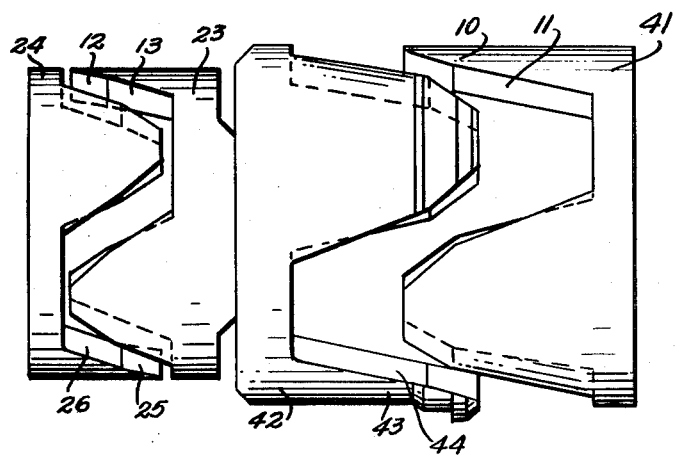
Fig. 7 is a fragmentary side elevation illustrating a detail.

A sleeve-shaped wedge means 23 is fixed to shaft 1 and is provided with claws 12, best shown in Fig. 7 which have helical wedge faces 13. Another sleeve-shaped wedge means 24 having claws 25 and helical wedge faces 26 is arranged opposite the sleeve-shaped wedge means 23 so that the claws 12 and 25 co-operate. The wedge means 24 is fixedly connected to the pressure member 15. A compression spring 14 is arranged between the wedge means 23 and the pressure member 15 and urges the pressure member 15 to move in axial direction to the left in Figs. 1 and 6. The movable pressure member 15 co-operates with another pressure member 8 which is mounted on shaft 1 and is prevented from axial movement by a shoulder on shaft 1.

Figure 10:
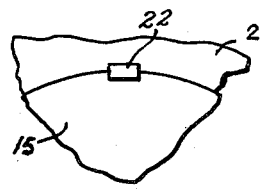
Fig. 10 is a fragmentary view of a detail.

A first friction wheel means including a plurality of friction discs 2 is mounted by means of a key 22 on the hub portion of member 15 slidable in axial direction, but non-rotatable. The friction discs 2 have peripheral outer rim portions 2', and are pressed toward each other by the pressure members 15 and 8 due to the action of the compression spring 14. The central bores of the friction discs 2 are provided with recesses to receive the key 22, as best seen in Fig. 10.

Figure 8:
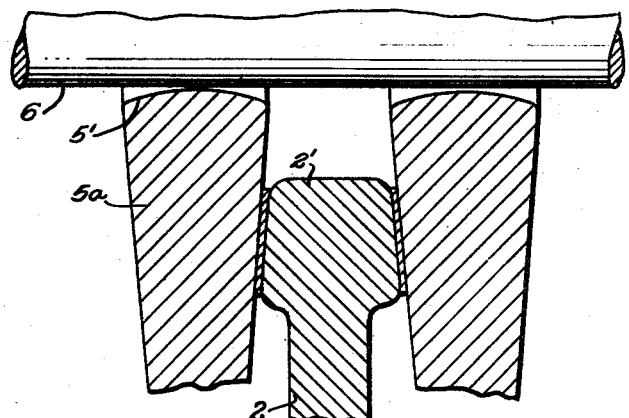
Fig. 8 is a fragmentary axial sectional view illustrating a construction detail of the friction discs.
Figure 9:
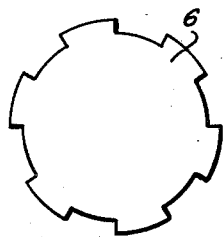
Fig. 9 is a cross-sectional view of a shaft.

In the illustrated embodiment, three shafts 6 are arranged parallel to the shafts 1 and 4, but it will be understood that any suitable number of shafts 6 may be provided. The shafts 6 are grooved, as best seen in Fig. 9, and each shaft 6 supports two groups 5a, 5b of rotary friction wheel means 5 which are spaced from each other in axial direction. The friction discs 5 are of the type having conical friction faces. The friction discs 5a are in frictional meshing engagement with the friction discs 2, the pressure between the pressure members 8 and 15 producing the required friction. As shown in Fig. 8, the central bores 5' in the friction discs 5a are bounded by convex arcuate surfaces widening in opposite axial directions so that the friction discs 5a may assume a slightly inclined position and can easily slide on the shaft 6. The same figure illustrates the slightly conical cross-section of the peripheral friction rims 2' of the friction discs 2.

The arrangement of the first friction wheel means 2 resembles a sun gear of an epicyclic gear, while the shafts 6 and the friction wheel means 5 resemble the planetary gears. The groups 5b of the friction discs on the shafts 6 are in frictional meshing engagement with annular friction discs 3 whose inner peripheral rims are shaped similar to the peripheral rims 2' of the friction discs 2. The annular friction discs 3 constitute a friction wheel means which resemble the internal outer gear of an epicyclic gear.

Figure 2:
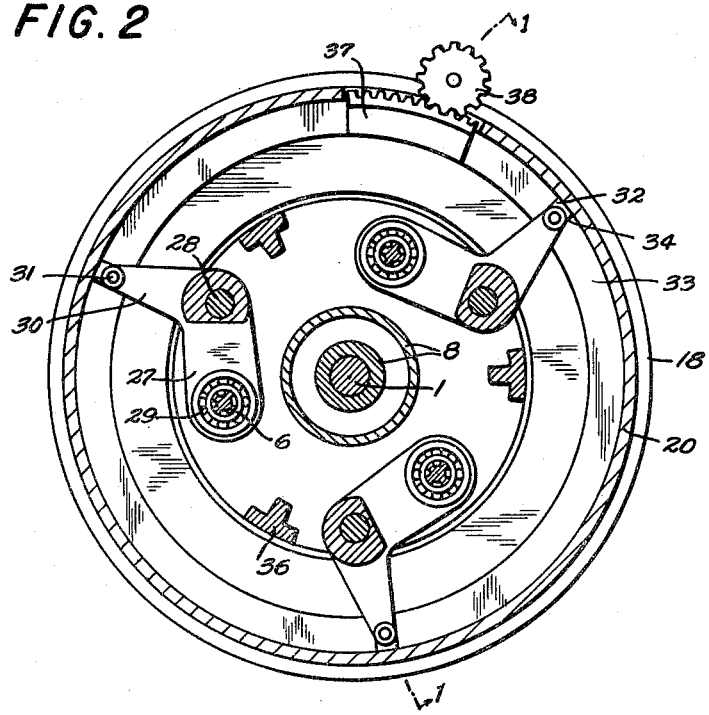
Fig. 2 is a cross-sectional view taken on line 2—2 in Fig. 1.
Figure 3:
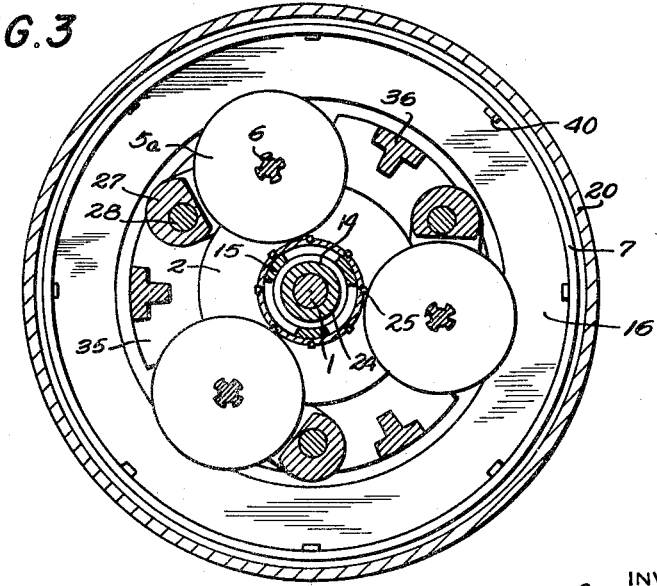
Fig. 3 is a cross-sectional view taken on line 3—3 of Fig. 1.
Figure 4:
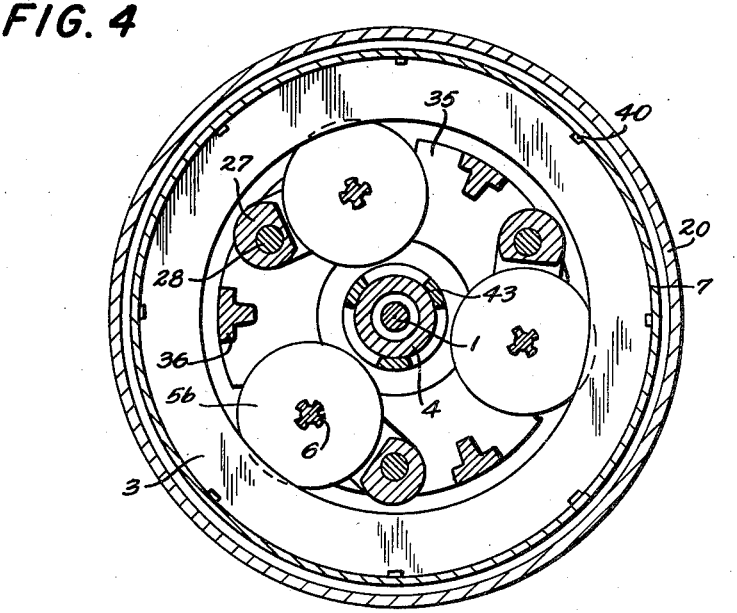
Fig. 4 is a cross-sectional view taken on line 4—4 of Fig. 1.
Figure 5:
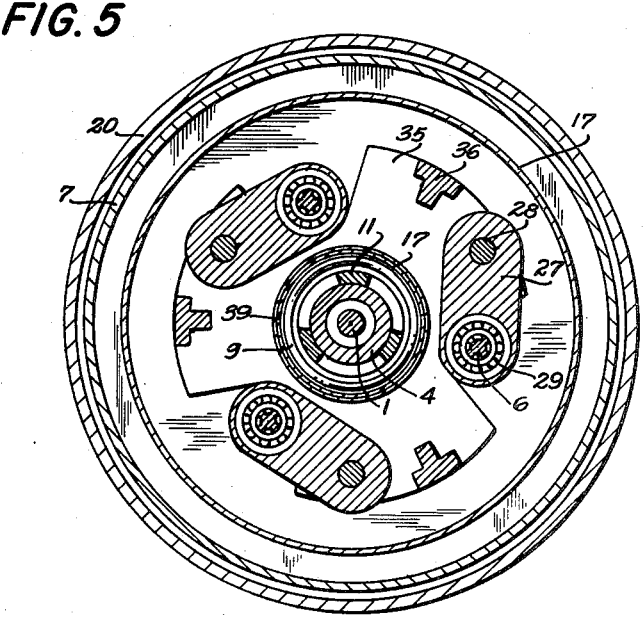
Fig. 5 is a cross-sectional view taken on line 5—5 of Fig. 1.

However, in contrast to an epicyclic gear, the shafts 6 of the present invention are mounted on the stationary casing. Each shaft 6 is mounted in a ball-bearing 29 of a movable supporting means 27. The movable supporting means 27 are pivotally mounted on pins 28 which are supported in the casing 18 and in the support member 35, respectively, as best seen in Figs. 1 and 2. The support member 35 is fixedly connected to the casing 18 by three axially extending bars 36 which are fixed in the casing 18. An arm 30 forms part of each supporting means 27 and carries a pivot pin 31 on which a slide member 32 is mounted. Each slide member 32 slides in a slot of a ring member 33 which carries a toothed segment 37 engaged by a gear 38, or by a worm. When the gear 38 is turned, the segment 37 is shifted, and the ring member 33 is turned so that the movable supporting means 27 pivot about the pins 28 and shift the shafts 6 in substantially radial direction with respect to the shafts 1 and 4. Consequently, members 38, 37, 33 constitute operating means for the movable supporting means 27. Shifting of the shafts 6 toward the shaft 1 moves the group of friction discs 5a into a position in which the friction rims 2' of the friction discs 2 engage the lateral conical friction faces of the friction discs 5a at points located closer to the shaft 6. Movement of the shaft 6 in outward direction will bring the friction wheel means 5a and 2 into a position in which the rims 2' will engage the peripheral portions of the friction discs 5a whereby the transmission ratio between the discs 5a and 2 will be varied.

Due to the conical shape of the friction discs 5, the spacing between the friction discs 2 must be varied, and the friction discs 2 must be spaced from each other to a greater extent when the rims 2' engage the thicker central portions of the conical friction discs 5a. Since the friction discs 5a and the friction discs 2 are mounted on their respective supporting shafts slidable in axial direction, the meshing friction discs move automatically to parallel proper positions.

In the position in which the friction discs 5a project almost to the shaft 1 between the friction discs 2, the pressure members 8, 15 are spaced a greater distance from each other, as shown in in Fig. 1. When the shafts 6 are moved away from the shaft 1, the friction discs 2 move toward each other due to the pressure of the pressure member 15 produced by the spring 14.

However, it is preferred that the pressure between the friction discs 2 and 5a corresponds to the contact pressure required for producing a frictional engagement sufficient for transmitting a predetermined variable load. The wedge means 24, 23 serve this purpose, while the compression spring 14 acts independently of the load and of the number of revolutions and produces the minimum pressure required during idling of the drive to prevent sliding of the friction discs.

A torque acting on the shaft 1 presses the helical wedge faces 13 of the claws 12 of the wedge means 23 against the co-operating helical wedge faces 26 of the claws 25 of the wedge means 24. The wedge means 23 is turned by shaft 1, on which it is fixed, and takes along the wedge means 24. The pressure between the wedge faces 26, 13 has an axial component which forces the wedge means 24, and thereby the pressure member 15 in axial direction toward pressure member 8. Thereby the fricton discs 5a and 2 are pressed against each other by an axial force which is proportional to the torque produced by the shaft 1 so that the frictional pressure between the friction discs is sufficient to transmit even the greatest loads, while unnecessary frictional losses are avoided when only a small load is transmitted.

A similar arrangement is provided for the annular friction discs 3 which rotate with the shaft 4. A sleeve-shaped wedge means 42 is fixedly connected with the shaft 4 for rotation therewith. The claws 43 of the wedge means 42 have helical wedge faces 44. A pressure member 17 is secured to shaft 4 and to the wedge means 42 by means of a ring 39 which is engaged by the compression spring 9. Another sleeve-shaped wedge means 41 is arranged opposite the wedge means 42 and is provided with claws 10 having wedge faces 11. The claws 43 and 10 project into the recesses between the claws of the opposite wedge means. The sleeve-shaped wedge means 41 is fixedly connected to the movable pressure member 7 which is mounted on the shaft 4 rotatable and slidable in axial direction. The other end of the compression spring 9 engages the pressure member 7. As best seen in Fig. 1, the annular friction discs 3, which are of the friction rim type, are mounted on the pressure member 7 non-rotatable, but slidable in axial direction, since keys 40 engage recesses in the friction discs 3. The pressure member 7 includes an inner flange 40' which is arranged opposite the axially fixed pressure member 17. The spring 9 urges the pressure member 7, 40' to the right in Fig. 1 so as to press the friction discs 3 towards the stationary pressure member 17. However, the friction discs 3 can slide in axial direction, and are farther spaced from each other when the thicker inner portions of the conical discs 5b engages the friction rims of the friction discs 3 which takes place when the shafts 6 are outwardly moved in radial direction. The conical discs 5 on the shafts 6 are arranged in two axially spaced groups 5a and 5b which co-operate, respectively, with the friction discs 2 and 3. All friction discs 5 on the shafts 6 are of the same type, that is, either conical discs or discs provided with a friction rim, and of course the friction discs 2 and 3 are of the other type to assure proper co-operation between the friction discs.

The operation of the wedge means 41, 42 is similar to the operation of the wedge means 23, 24. During idling or during a small load, the pressure spring 9 urges the movable pressure member 7, 40' in axial direction toward the fixed pressure member 17 and produces sufficient pressure between the friction discs 3 and 5b. As the load increases, the wedge means 42 which are fixed on the shaft 4 act through the wedge faces 44, 11 on the wedge means 41 so that the axial pressure component forces the wedge means 41 and pressure member 7, 40' to the right in Figs. 1 and 6. Consequently, the force which presses the friction discs 3 and 5b against each other is proportional to the transmitted torque.

When the shafts 6 are shifted inwardly in substantially radial direction as previous described, the friction discs 5a project deeply between the friction discs 2. The friction discs 5b are withdrawn from the annular friction discs 3 and engage the peripheral rim portions of the friction discs 3 with their peripheral zones. When the shafts 6 are moved outwardly the group of friction discs 5b deeply projects into the annular friction discs 3, while the peripheral zones of the friction discs 5a engage the friction rims of the friction discs 2. Consequently, the transmission ratios are changed, since the effective radii of the two pairs of co-operating friction wheel means 5a, 2 and 5b, 3 are varied.

When the shafts 6 are in outer position, the friction discs 5b project deeply into the friction discs 3 and move the same apart since the central portions of the conical friction discs 5 are thicker. At the same time, the spring 14 moves the friction discs 2 towards each other since the thinner peripheral zones of the friction discs 5a engage the rims of the friction discs 2. When the shafts 6 are inwardly moved, the friction discs 2 are farther spaced, and the friction discs 3 are closer spaced, as shown in Fig. 1. Consequently, the length of the shafts 6 required for the friction discs 5a and 5b, whose spacing corresponds to the spacing of the friction discs 2 and 3, remains the same. This highly advantageous result which permits a short axial length of the entire drive, is obtained by placing the fixed pressure members 8 and 17 outwardly in axial direction, and the movable pressure members 15, 40' inwardly in axial direction so that the same lengths of the shafts 6 are occupied by the friction discs 5a, 5b regardless of the position of the shafts 6.

The helical wedge faces of the wedge means 23, 24 and 41, 42 preferably have such shape that the axial components of the pressure change with the applied torque. As best seen in Fig. 7, the wedge faces have such shape that wedge angle is increased as the wedge means 23 and 24, and 41, 42, respectively, move apart. Consequently, the axial component of the force produced by the torque increases to a higher extent than the torque, and the pressure acting on the friction discs varies with the load.

Due to the fact that the friction discs 2 co-operate with one group of friction discs 5a, and the friction discs 3 co-operate with another group of friction discs 5b, all friction discs remain parallel, and substantially perpendicular to their axes of rotation regardless of their spacing which changes in accordance with the thickness of the portion of the friction discs 5 engaged by the rims of the friction discs 2 and 3, respectively. This is highly advantageous, as compared with the arrangements of the prior art in which the same conical friction discs were engaged by friction discs corresponding to the friction discs 2 and 3 so that the conical friction discs 5 were forced to assume an oblique position. An oblique position of the conical discs causes improper frictional engagement between the friction discs and the frictional losses which are avoided by the construction of the present invention.

It will be understood that each of the elements described above, or two or more together, may also find a useful application in other types of gradually variable friction drives differing from the types described above.

While the invention has been illustrated and described as embodied in a variable friction drive including two axially spaced groups of friction discs connected for rotation and being movable for varying the transmission ratio between the same and two other groups of friction discs engaged by the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Gradually variable friction transmission comprising, in combination, first shaft means; a set of first parallel friction discs having peripheral rigid friction rims and being secured to said first shaft means for rotation therewith and slidable in axis direction; first spring-loaded pressure means engaging the outermost friction discs of said first set of friction discs for urging said first friction discs to a closer spaced parallel position; second shaft means coaxial with said first shaft means; a set of second parallel annular friction discs having inner annular rigid friction rims and being secured to said second shaft means for rotation therewith and slidable in axial direction, said set of second friction discs being spaced in radial and axial directions from said set of first friction discs; second spring-loaded pressure means engaging the outermost friction discs of said second set of friction discs for urging said second friction discs to a closer spaced parallel position; at least one third shaft means parallel to said first and second shaft means; two axially spaced groups of third parallel friction discs having lateral conical friction faces and being secured to said third shaft means for rotation therewith and slidable in axial direction while remaining in parallel position, said friction faces of said third friction discs of one of said groups being in frictional meshing engagement with said rigid friction rims of said first friction discs only, and said friction faces of said third friction discs of the other of said groups being in frictional meshing engagement with said rigid friction rims of said second friction discs only for transmitting high torque at a great reduction ratio; movable supporting means supporting said third shaft means rotatable and shiftable between one position in which said first and third shaft means are farther spaced and another position in which said first and third shaft means are closer spaced; and operating means for moving said movable supporting means between said positions for gradually changing the ratio of transmission between said first and third shaft means.

2. Gradually variable friction transmission comprising, in combination, first shaft means; a set of first parallel friction discs having peripheral rigid friction rims and being secured to said first shaft means for rotation therewith and slidable in axis direction; first spring-loaded pressure means engaging the outermost friction discs of said first set of friction discs for urging said first friction discs to a closer spaced parallel position; second shaft means coaxial with said first shaft means; a set of second parallel annular friction discs having inner annular rigid friction rims and being secured to said second shaft means for rotation therewith and slidable in axial direction, said set of second friction discs being spaced in radial and axial directions from said set of first friction discs; second spring-loaded pressure means engaging the outermost friction discs of said second set of friction discs for urging said second friction discs to a closer spaced parallel position; at least one third shaft means parallel to said first and second shaft means; two axially spaced groups of third parallel friction discs having lateral conical friction faces and being secured to said third shaft means for rotation therewith and slidable in an axial direction while remaining in parallel position, said friction faces of said third friction discs of one of said groups being in frictional meshing engagement with said rigid friction rims of said first friction discs only, and said friction faces of said third friction discs of the other of said groups being in frictional meshing engagement with said rigid friction rims of said second friction discs only for transmitting high torque at a great reduction ratio; movable supporting means supporting said third shaft means rotatable and shiftable between one position in which said first and third shaft means are farther spaced and another position in which said first and third shaft means are closer spaced; operating means for moving said movable supporting means between said positions for gradually changing the ratio of transmission between said first and third shaft means; and two force transmitting means respectively connecting said first shaft means with said first pressure means and said second shaft means with said second pressure means for respectively actuating the same in accordance with the torque acting on said shaft means.

3. A transmission as set forth in claim 2 wherein said third friction discs have central openings receiving said third shaft means, said central openings being bounded by convex arcuate surfaces outwardly widening in opposite axial directions.

4. Gradually variable friction transmission comprising, in combination, first shaft means; a set of first parallel friction discs having peripheral rigid friction rims and being secured to said first shaft means for rotation therewith and slidable in axial direction; first spring-loaded pressure means including a pair of first pressure members respectively engaging the outermost friction discs of said first set of friction discs for urging said first friction discs to a closer spaced parallel position; first wedge means on said first shaft means and on one of said first pressure members for moving and pressing the same toward the other first pressure member in accordance with the torque acting on said first shaft means; second shaft means coaxial with said first shaft means; a set of second parallel annular friction discs having inner annular rigid friction rims and being secured to said second shaft means for rotation therewith and slidable in axial direction, said set of second friction discs being spaced in radial and axial directions from said set of first friction discs; second spring-loaded means including a pair of second pressure members respectively engaging the outermost friction discs of said second set of friction discs for urging said second friction discs to a closer spaced parallel position; second wedge means on said second shaft means and on one of said second pressure members for moving and pressing the same toward the other second pressure member in accordance with the torque acting on said second shaft means; at least one third shaft means parallel to said first and second shaft means; two axially spaced groups of third parallel friction discs having lateral conical friction faces and being secured to said third shaft means for rotation therewith and slidable in axial direction while remaining in parallel position, said friction faces of said third friction discs of one of said groups being in frictional meshing engagement with said rigid friction rims of said first friction discs only, and said friction faces of said third friction discs of the other of said groups being in frictional meshing engagement with said rigid friction rims of said second friction discs only for transmitting high torque at a great reduction ratio; movable supporting means supporting said third shaft means rotatable and shiftable between one position in which said first and third shaft means are farther spaced and another position in which said first and third shaft means are closer spaced; and operating means for moving said movable supporting means between said positions for gradually changing the ratio of transmission between said first and third shaft means.

5. A transmission as set forth in claim 4 wherein said first and second wedge means have wedge faces of such shape that the axial components of the force transmitted by said wedge means varies with the axial position of the associated pressure members and in accordance with the transmitted torque.

6. A transmission as set forth in claim 4 wherein the other of said first pressure members, and the other of said second pressure members are fixed; and wherein said one first pressure member, and said one second pressure member are spaced from each other a shorter axial distance than said other fixed pressure members and located between said other fixed pressure members.

7. A transmission as set forth in claim 6 wherein each of said first and second wedge means has a plurality of claws having wedge faces curved for varying the axial components of the force transmitted by said wedge means in accordance with the axial positions of the respective associated pressure members and in accordance with the transmitted torque.

8. A gradually variable friction drive comprising, in combination, first rotary friction wheel means having a first axis of rotation; second rotary friction wheel means spaced both radially and axially from said first rotary friction wheel means; two coaxial groups of third rotary friction wheel means rotationally fixed to a common shaft disposed on a second axis offset from said first axis of rotation, each of said coaxial groups comprising a plurality of friction elements, certain of said elements of each coxial group being axially shiftable relative to said common shaft, independently of the elements of the other coaxial group whereby said coaxial groups may independently expand and contract axially, one of said coaxial groups being in frictional meshing engagement with said first friction wheel means only and the other of said coaxial groups being in frictional meshing engagement with said second friction wheel means only; movable supporting means supporting said third friction wheel means for movement of said second axis toward and away from said first axis; operating means for so moving said movable supporting means; and spring means resiliently urging axial contraction of said coaxial groups, certain of said friction wheel means being of the double-coned disc type, others of said friction wheel means being of the axially-thickened rim type, said first and second friction wheel means both being of one of said types and the elements of said coaxial groups all being of the other of said types.

9. A gradually variable friction drive comprising an input shaft; an output shaft coaxial with said input shaft; a first group of friction wheels carried by said input shaft to rotate therewith, and certain of said wheels being axially shiftable relative to said shaft whereby the group may expand and contract axially; a second group of friction wheels carried by said output shaft to rotate therewith, and certain of said last-named wheels being axially shiftable relative to said output shaft whereby said second group may expand and contract axially, said second group being axially spaced from said first group; the wheels of one of said groups having only their internal peripheries supported and the wheels of the other of said groups having only their external peripheries supported; a third shaft; movable means supporting said third shaft for rotation on an axis disposed between the imaginary cylinder containing the external peripheries of said one wheel group and the imaginary cylinder containing the internal peripheries of said other wheel group; a third group and a fourth group of friction wheels carried, in axially-spaced relation, on said third shaft for rotation therewith, certain of the wheels of each of said third and fourth groups being axially shiftable relative to said third shaft whereby each of said third and fourth groups may expand and contract axially; the wheels of said third group frictionally intermeshing with the wheels of said first group and the wheels of said fourth group frictionally intermeshing with the wheels of said second group; means yieldingly urging axial contraction of all of said wheel groups; and operating means for said movable means to shift said third shaft toward and away from the common axis of said input and output shafts; the wheels of certain of said groups being of the double-coned disc type, the wheels of others of said groups being of the axially-thickened rim type; and all of the wheels of coaxial groups being of the same type.

References Cited in the file of this patent

UNITED STATES PATENTS

| 1,017,893 | Landis | Feb. 20, 1912 |
| 2,563,896 | Wildhaber | Aug. 14, 1951 |
| 2,591,753 | Wildhaber | Apr. 8, 1952 |
| 2,623,396 | Beier | Dec. 30, 1952 |

FOREIGN PATENTS

| 11,326 | Austria | Mar. 26, 1953 |
| 176,410 | Austria | Oct. 26, 1953 |
| 235,562 | Great Britain | Nov. 12, 1925 |
| 295,131 | Great Britain | Aug. 9, 1928 |
| 399,506 | France | Apr. 23, 1909 |
| 897,942 | Germany | Nov. 26, 1953 |
| 1,028,160 | France | Feb. 23, 1953 |
| 1,064,150 | France | Dec. 23, 1953 |